(12) United States Patent
Hutchin

(10) Patent No.: US 8,755,036 B2
(45) Date of Patent: Jun. 17, 2014

(54) ACTIVE IMAGING SYSTEM AND METHOD

(75) Inventor: Richard A. Hutchin, Calabasas, CA (US)

(73) Assignee: Optical Physics Company

( * ) Notice: Subject to any disclaimer, the term of this patent is extended or adjusted under 35 U.S.C. 154(b) by 433 days.

(21) Appl. No.: 13/046,109

(22) Filed: Mar. 11, 2011

(65) Prior Publication Data

US 2012/0162631 A1 Jun. 28, 2012

Related U.S. Application Data

(60) Provisional application No. 61/312,905, filed on Mar. 11, 2010.

(51) Int. Cl.
*G01C 3/08* (2006.01)
(52) U.S. Cl.
USPC ......... 356/4.07; 356/520; 356/521; 356/4.01; 356/496

(58) Field of Classification Search
USPC .............. 356/4.07, 520, 521, 4.01, 496
See application file for complete search history.

(56) References Cited

U.S. PATENT DOCUMENTS

| | | | | |
|---|---|---|---|---|
| 4,102,572 A | * | 7/1978 | O'Meara | 250/201.9 |
| 4,792,231 A | * | 12/1988 | Fried | 356/521 |
| 6,597,836 B2 | * | 7/2003 | Johnson et al. | 385/33 |
| 7,495,748 B1 | * | 2/2009 | Sandusky et al. | 356/5.1 |
| 7,889,356 B2 | * | 2/2011 | Kuchel | 356/520 |
| 7,990,548 B2 | * | 8/2011 | Babayoff et al. | 356/609 |
| 2005/0230477 A1 | * | 10/2005 | Tsikos et al. | 235/454 |

* cited by examiner

*Primary Examiner* — Isam Alsomiri
*Assistant Examiner* — Samantha K Abraham
(74) *Attorney, Agent, or Firm* — The Belles Group, P.C.

(57) ABSTRACT

An active imaging system includes a laser transmitter configured to emit light in a plurality of beamlets. A sensor is configured to receive light from the beamlets. A processor is communicably coupled to the sensor and configured to compute images of objects illuminated by the beamlets.

1 Claim, 9 Drawing Sheets

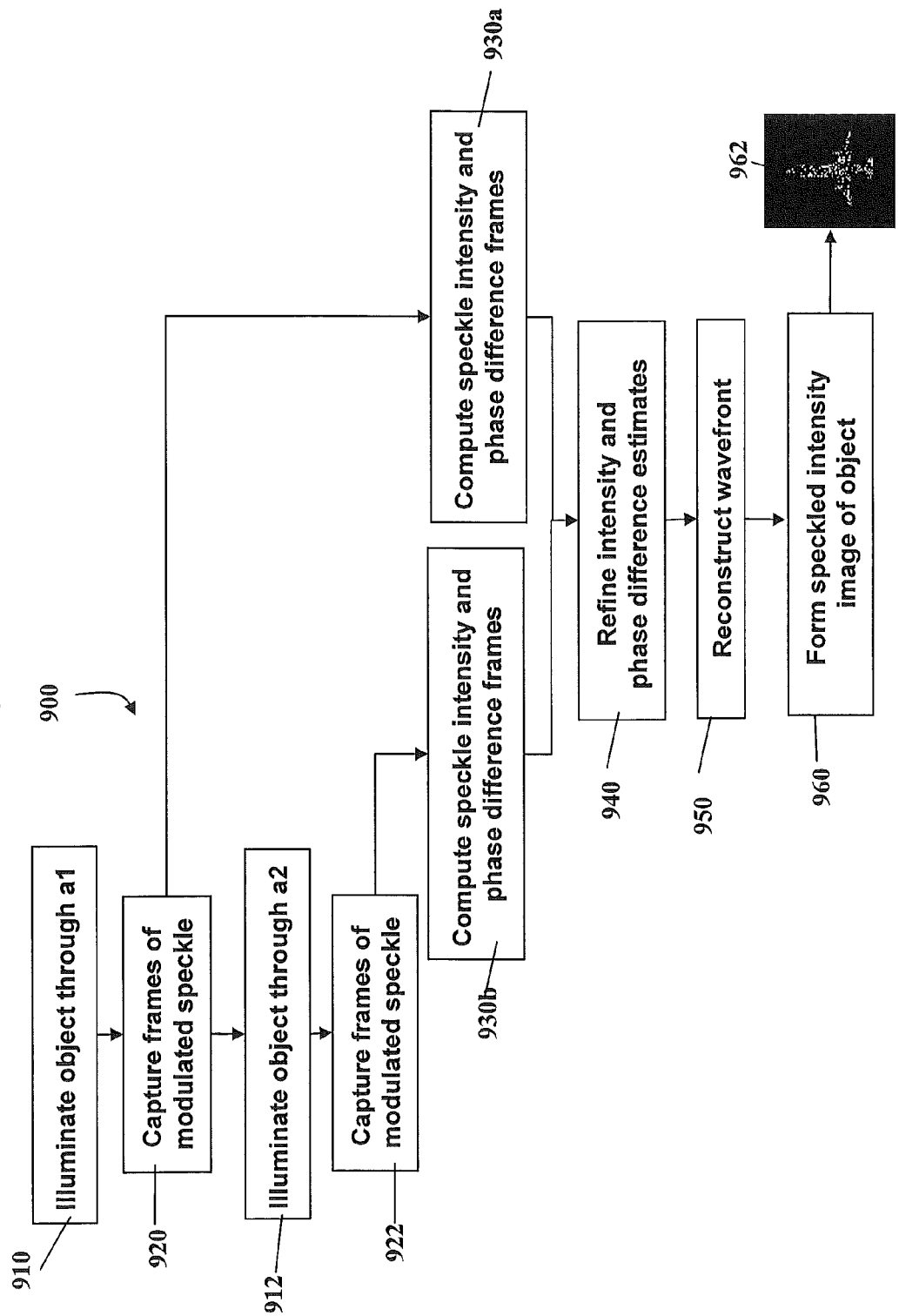

ACTIVE IMAGING SYSTEM AND METHOD

PRIORITY

Priority is claimed to U.S. provisional patent application No. 61/312,905, filed Mar. 11, 2010. The disclosure of the aforementioned priority document is incorporated herein in its entirety.

BACKGROUND OF THE INVENTION

1. Field of the Invention

The field of the present invention relates to active imaging systems that use multiple coherent beams for illuminating and imaging an object.

2. Background

Imaging of objects has been of interest to many civilian and military users for many years. Images can be obtained passively or actively. In general terms, passive imaging uses either naturally occurring electromagnetic rays (e.g., rays of the Sun or the Moon) that reflect or scatter from the object or electromagnetic radiation emanating from the object being imaged, or both. Active imaging, on the other hand, relies on an artificial illumination source which is often part of the imaging system.

One active imaging technique in the art is called Sheared Coherent Interferometric Photography (SCIP). This technique has been described at length in the following publications:

1. R. A. Hutchin. Sheared Coherent Interferometric Photography. A Technique for Lensless Imaging. SPIE Vol. 2029 Digital Image Recovery and Synthesis II (1993) pp. 161-168.
2. D. G. Voelz, J. D. Gonglewski, P. S. Idell. SCIP computer simulation and laboratory verification SPIE Vol. 2029 Digital Image Recovery and Synthesis II (1993) pp. 169-176.

SCIP allows near-diffraction limited remote imaging of objects through turbulent media. SCIP utilizes three illuminating beamlets and a detector array comprised of discrete intensity detectors. The advantages of SCIP over conventional imaging techniques include the ability to image through phase aberrating media, for example, the atmosphere, and the potential for implementing large detector arrays that are necessary for long range high resolution imaging. One utility for such a system is imaging space objects (e.g., Earth orbiting satellites) from the ground. Another utility is imaging remote moving objects, such as targets from a moving platform, e.g., missile tracking.

SCIP operation makes use of the physical properties of speckle patterns. A speckle pattern is a random intensity pattern produced by the mutual interference of a set of wavefronts. Speckle patterns are created when a laser beam is scattered off a rough surface. Speckle patterns reflect off an object just like light off a mirror. Thus, if one moves the source 1 mm to the left, the speckle pattern scattered back from the target will move 1 mm to the right. Illuminating the object with three coherent beamlets at the same time results in three nearly identical interfering speckle patterns which can be observed or registered by a suitable sensor. Then by phase modulating the three beamlets with respect to each other, one can measure the phase differences between each of these speckle patterns. If one beamlet is considered the reference source, and another beamlet is shifted 1 mm in the x direction and the remaining beamlet is shifted 1 mm in the y direction, then the demodulated signals at the sensor will provide the discrete complex gradient of the speckle pattern at 1 mm spacing. These gradients can then be reconstructed in a noise-optimized manner to provide an excellent measurement of the full object speckle pattern at the detector plane. A simple Fourier transform will then produce the complex target image.

The algorithm or process used to reconstruct the full speckle field from the complex gradients is called a complex exponential reconstructor. The complex exponential reconstructor is used routinely in adaptive optic systems to provide accurate wavefront reconstructions.

In a typical SCIP system 100, schematically illustrated in FIG. 1, a laser transmitter 115 is configured to emit light at a predetermined wavelength in three beamlets 110 through three transmit apertures 118, and a detector array 130 is configured to receive light 125 scattered by an object 105 illuminated by the beamlets 110. The laser transmitter 115 may be coupled to a laser source 117. The detector array 130 is an array of individual intensity detectors 132. A processor 150 communicates with the detector array 130 and is configured to form images of the object 105 based upon the output from the detector array 160. The processor 150 may also be configured to control the laser transmitter 115. As shown in FIG. 1 detail, the three beamlets 110a, 110b, and 110c emanate from co-planar transmit apertures 118a, 118b, 118c located on the laser transmitter plane 116. A first reference beamlet 110a, a second beamlet 110b sheared in the x direction with respect to the referenced beamlet and a third beamlet 110c sheared in the y direction with respect to the reference beamlet form an "L" spatial pattern. The beamlets 110a, 110b, and 110c are also shifted slightly in frequency with respect to one another. The first reference beamlet 110a has frequency ($v_0$), the second x-sheared beamlet 110b has frequency ($v_0+v_x$) and the third y-sheared beamlet 110c has frequency ($v_0+v_y$). The frequency differences cause the beamlets to "beat" at the object at the difference frequencies. The beat frequencies are $v_x$, $v_y$, and $v_x-v_y$. The frequency shifts are usually very small compared to the actual frequencies of the beamlets. The frequency shifts may be realized using phase modulators included in the laser transmitter 115. The processor 150 may be configured to control the phase modulators associated with the beamlets. The beamlets 110 travel through a turbulent medium 120 and reach the object 105. The object 105 scatters the incident beamlets 110. The scattered laser light 125 produces a modulated speckled intensity pattern 135 at the detector array 130. Speckles are formed since the object surface usually has roughness on the order of the laser wavelength. The detector array 130 measures the spatial and temporal behavior of the modulated speckled intensity pattern 135.

The fields returned from the object can be written as follows:

$$A_o(r,t)=\sqrt{I_0}a(r)\exp(j\phi(r))\exp(j2\pi v_0 t)$$

$$A_x(r,t)=\sqrt{I_x}a(r+s_x)\exp(j\phi(r+s_x))\exp(j2\pi(v_0+v_x)t)$$

$$A_y(r,t)=\sqrt{I_y}a(r+s_y)\exp(j\phi(r+s_y))\exp(j2\pi(v_0+v_y)t) \qquad \text{Equation 1}$$

where $I_0$, $I_x$, and $I_y$ are the intensities of the reference, x, and y sheared beamlets (110a, 110b, and 110c), $s_x$ and $s_y$ are vectors representing the direction and magnitude of the x and y sheared beamlets 110b and 110c, and $\phi(r)$ is the phase of the reference beamlet (110a). The function a(r) represents a normalized (real valued) field amplitude so that the spatially averaged value of its intensity is 1.

The return light from these three beamlets are superimposed at the detector array and the resulting measured intensity pattern at point r and time t I(r,t) on the detector array is given by:

$$I(r,t) = |A_o(r,t) + A_x(r+s_x,t) + A_y(r+s_y,t)|^2 \quad \text{Equation 2}$$

Equation 2 can be algebraically evaluated and re-written as follows:

$$I(r,t) = I_m\{1 + V_x(r)\cos[2\pi v_x t + \Delta\phi_x(r)] + V_y(r)\cos[2\pi v_y t + \Delta\phi_y(r)] + V_{xy}(r)\cos[2\pi(v_x - v_y)t + \Delta\phi_{xy}(r)]\} \quad \text{Equation 3}$$

where the mean intensity at a point r is $$I_m = I_0[a(r)]^2 + I_x[a(r+s_x)]^2 + I_y[a(r+s_y)]^2$$

and the visibility factors are $$V_x(r) = 2I_m^{-1}\sqrt{I_0 I_x}\,a(r)a(r+s_x)$$

$$V_y(r) = 2I_m^{-1}\sqrt{I_0 I_y}\,a(r)a(r+s_y)$$

$$V_{xy}(r) = 2I_m^{-1}\sqrt{I_x I_y}\,a(r+s_x)a(r+s_y)$$

and the spatial phase differences are defined by $$\Delta\phi_x(r) = \phi(r) - \phi(r+s_x)$$

$$\Delta\phi_y(r) = \phi(r) - \phi(r+s_y)$$

$$\Delta\phi_{xy}(r) = \phi(r+s_x) - \phi(r+s_y)$$

FIG. 2 illustrates the SCIP method 200. The process starts with step 210, namely illumination of the object 105. The processor 150 directs the laser transmitter 115 to send three pulsed or continuous beamlets 110 towards the object 105. During this illumination step 210 the processor 150 adjusts the phase modulators controlling the phases of the beamlets 110 in a way that produces slight shifts in the frequency of the outgoing beamlets 110. Next, at step 220, the detector array 130 receives and captures frames of modulated speckled intensity patterns 135. The measured speckled intensity pattern I(r,t) is a superposition of three patterns as defined above in Equation 2. The detector array measurements 160 are communicated to the processor 150. The measurements 160 which have been defined as I(r,t) can be demodulated at the beat frequencies $v_x$, $v_y$, and $v_x - v_y$ to yield estimates of the intensity visibilities and phase differences also defined in Equation 3. The optical field amplitude of one of the beamlets (e.g., a(r)) can then be obtained from the visibility estimates. The optical phase of the wavefront (e.g., $\phi(r)$) can be found using the phase difference estimates. Accordingly, at step 230, the processor 150 demodulates the measurements 160 to yield estimates of intensity visibilities and phase differences 232.

Several algorithms have been developed to recover the field amplitude and phase from the intensity measurements which are commonly collected and stored as a time series of samples. Three or four time samples per cycle of the highest beat frequency are typically considered adequate to determine the phase of the beat signal. Demodulation of beat frequencies can be done using a Fourier transform of the time series at each detector 132.

Once visibility and phase difference values are computed, the next step 240 is reconstructing the wavefront, that is, recovering the optical field amplitude and phase. The reconstructed wavefront is often an estimate of $A_0(r,t)$ as defined in Equation 1. At the following step 250, the reconstructed wavefront is inverse Fourier transformed and the squared modulus is computed to yield a two dimensional snapshot image 252. This two dimensional snapshot image 252 is often speckled. As explained earlier, this is due to the object surface having roughness on the order of the laser wavelength. A series of snapshot images 254 can be collected, registered, and averaged as shown in process 260 to reduce speckle noise in the final two dimensional image 262.

The SCIP system and method described above has two fundamental limitations. First, it can be used to make two dimensional images only. Since the two dimensional image generated by SCIP is a projection of the three dimensional object 105 onto a two dimensional image plane, the surface contours of the object 105 are not available. To obtain surface contours, one would need to compute the range to object 105 at multiple two dimensional image pixels. Second, even though it is virtually immune to turbulence effects near the detector array, SCIP is adversely impacted by turbulence, in particular anisoplanatic and scintillation effects.

SUMMARY OF THE INVENTION

The present invention is directed toward a system and method for active imaging that is immune to atmospheric turbulence and capable of producing three dimensional images of objects. The SCIP system and method described above form the starting point of the present invention.

To add imaging capability in the third dimension, the SCIP system and method are reconfigured via the following three modifications:

First, the system is modified: The laser source generating the illuminating beamlets is reconfigured so that it emits light at two or more wavelengths. The illuminating beamlets' wavelengths can be varied by the processor or a separate controller. Note this variation in wavelength is separate and apart from the frequency shifting between beamlets. With varied wavelength, the random complex amplitude of each detector measurement (or, each pixel in the speckle amplitude image) will change in phase proportional to the depth of the scattering area with an arbitrary overall phase. This arbitrary overall phase means that the absolute range to the objects in the image cannot be recovered. However, within the image the relative phase of each pixel shifts proportionally to its differential range. This relative phase can be recovered. A range image can be computed using this relative phase information.

Second, the method for illuminating the object is modified. The single wavelength illumination step is replaced by at least two illuminating steps, each with a different wavelength. Furthermore, multiple sets of data are obtained, one set per illumination step.

Third, the method for processing the frames captured by the detector array is modified. The new process can be used to make an image of the object contour subject to a $2\pi$ ambiguity which can often be resolved simply by continuizing the phase change image. Since the absolute range of the object region is usually of minor interest compared to the relative range change within the image, the multiple wavelength information can be used to produce a three dimensional image of the object.

Thus, by using the change in the random phase of the complex object image with illumination beamlet wavelength, the range changes across the image can be mapped to create a three dimensional image, including both a two dimensional speckled image and a relative range image. The two dimensional image is similar to the image one would obtain using the original SCIP system and method. The relative range image on the other hand, as explained earlier, may not be obtained using SCIP system and method. Furthermore, the relative range image may not be subject to speckle intensity variations that cause the grainy quality of the two dimensional image since the phase change with wavelength is proportional to the difference in range. Accordingly, averaging of relative range images is not necessary, and even a single relative range image of the object will provide a high quality object surface contours information suitable for automated detection and identification of objects and aimpoints on the object.

To overcome atmospheric turbulence in particular anisoplanatic and scintillation effects, the present invention reconfigures the SCIP system and method via the following three modifications:

First, the system is modified: The laser source generating the illuminating beamlets is reconfigured so that it is capable of emitting at least two sets of three beamlets through two sets of spatially distinct apertures.

Second, the method for illuminating the object is modified. The single step illumination is replaced by two or more illuminating steps wherein each illumination step involves sending out three beamlets towards the object through spatially distinct set of three apertures. Multiple sets of data are obtained, one set per illumination step.

Third, the method for processing the frames captured by the array of detectors is modified. Combining the speckle intensity and phase difference estimates for each set of data leads to a refined estimate of these quantities which in turn leads to an improved reconstructed wavefront which reduces the adverse impact of atmospheric turbulence in the final image.

Accordingly, an improved system and method for active imaging is disclosed. Advantages of the improvements will appear from the drawings and the description of the embodiments.

BRIEF DESCRIPTION OF THE DRAWINGS

In the drawings, wherein like reference numerals refer to similar components:

FIG. 9 is a flow chart illustrating a two dimensional turbulence immune imaging method suitable for the imaging system of FIG. 7.

DETAILED DESCRIPTION OF THE PREFERRED EMBODIMENTS

Figure 1:
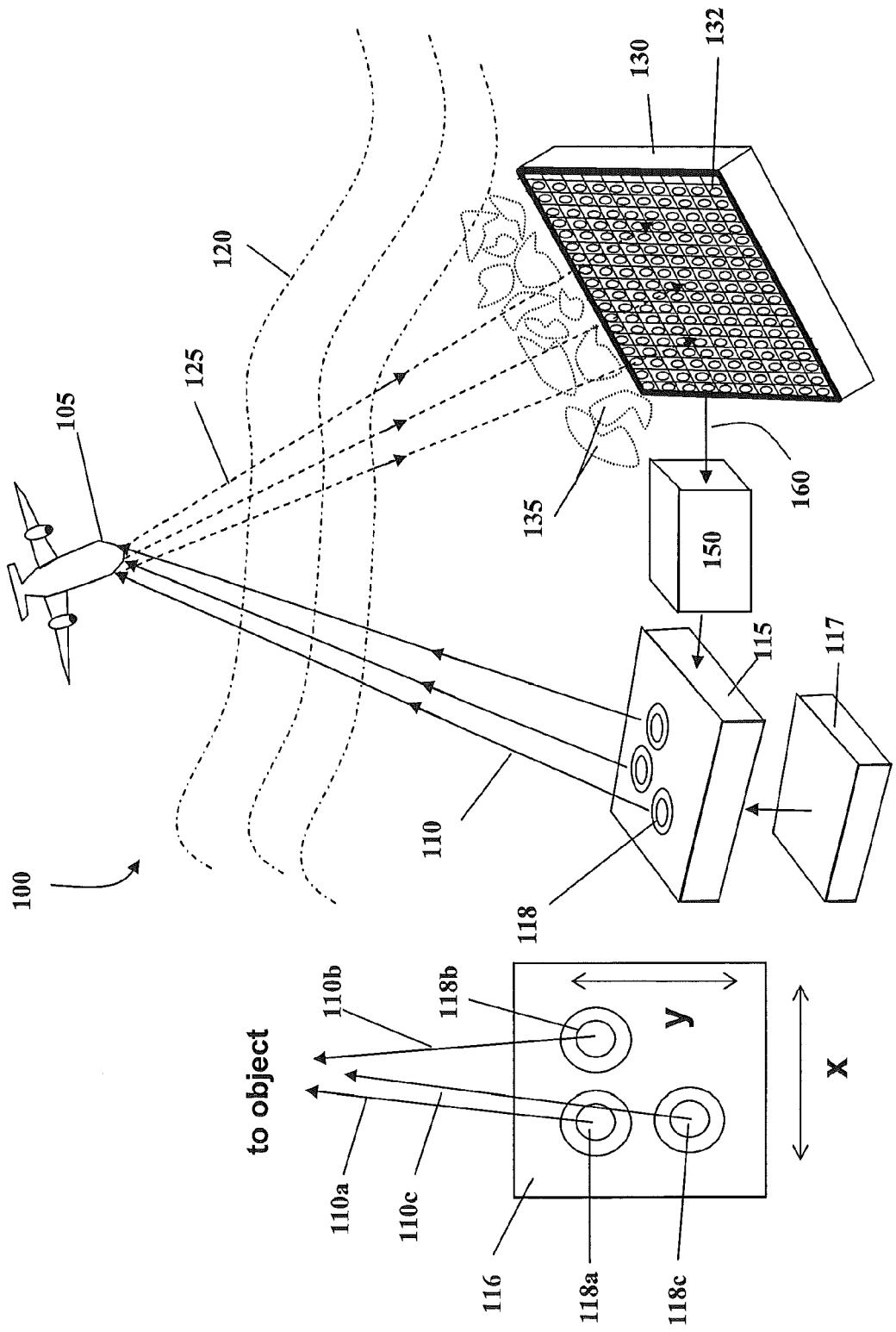
FIG. 1 (Prior Art) schematically illustrates the SCIP imaging system.
Figure 2:
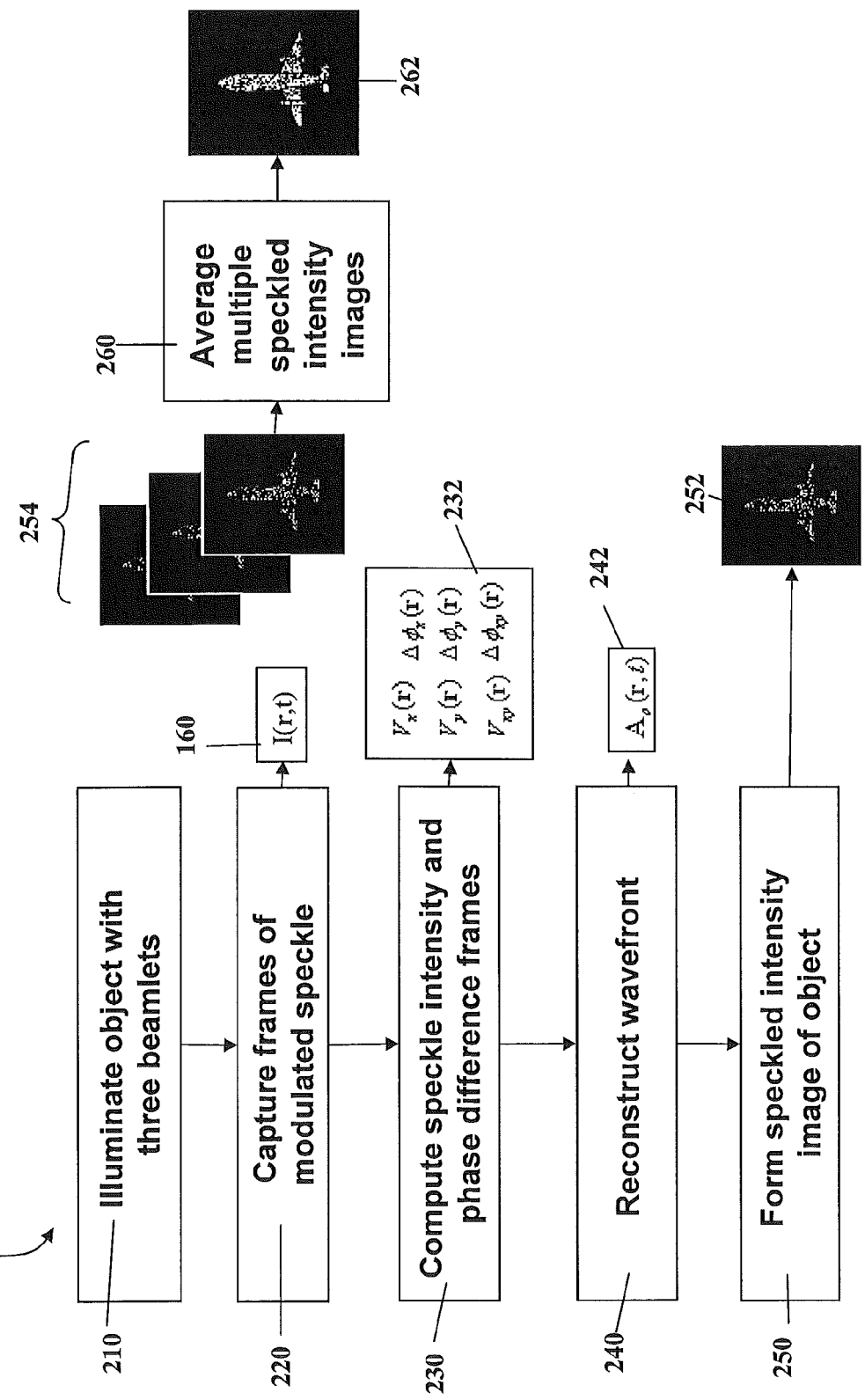
FIG. 2 (Prior Art) is a flow chart illustrating the two dimensional imaging method suitable for the SCIP system of FIG. 1.
Figure 3:
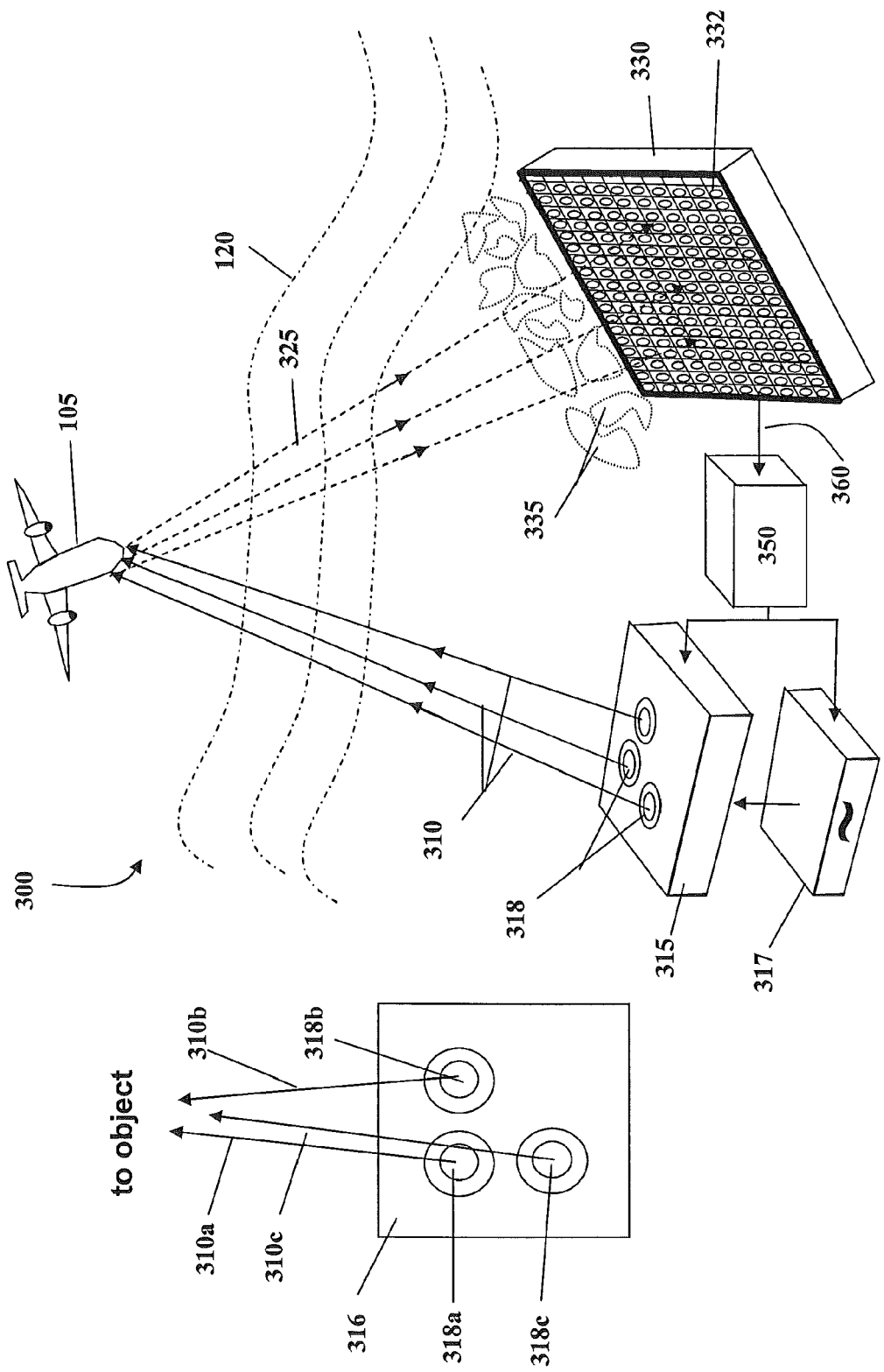
FIG. 3 schematically illustrates a three dimensional embodiment of the active imaging system.

Turning in detail to the drawings, FIG. 3 illustrates a three dimensional active imaging system 300. A laser transmitter 315 is configured to emit three beamlets 310 through transmit apertures 318, and a detector array 330 is configured to receive light 325 scattered by an object 105 illuminated by the beamlets 310. The laser transmitter 315 receives laser light from a laser source 317. The laser source 317 is configured to produce laser light at least at two wavelengths. The detector array 330 is an array of individual intensity detectors 332. A processor 350 communicates with the detector array 330 and is configured to form images of the object 105 based upon the output from the detector array 360. The processor 350 may also be configured to control the laser transmitter 315 and the laser source 317. Two of the beamlets 310b and 310c are laterally displaced (sheared) with respect to the reference beamlet 310a. Three beamlets (310a, 310b, and 310c) emanate from transmit apertures 318a, 318b, 318c at the laser transmitter plane 316. The reference beamlet 310a, the beamlet 310b which is sheared in the x direction with respect to the referenced beamlet and the beamlet 310c sheared in the y direction with respect to the reference beamlet form an "L" spatial pattern. The beamlets 310a, 310b, and 310c are also shifted slightly in frequency with respect to one another. The first reference beamlet 310a has frequency ($v_0$), the second x-sheared beamlet 310b has frequency ($v_0+v_x$) and the third y-sheared beamlet 310c has frequency ($v_0+v_y$). The frequency differences cause the beamlets to "beat" at the object at the difference frequencies. The beat frequencies are $v_x$, $v_y$, and $v_x-v_y$. The frequency shifts are usually very small compared to the actual frequencies of the beamlets. The frequency shifts may be realized using phase modulators included in the laser transmitter 315. The processor 350 may be configured to control the phase modulators associated with at least one of the beamlets. The beamlets 310 travel through a turbulent medium 120 and reach the object 105. The object 105 scatters the incident beamlets 310. The scattered laser light 325 produces a modulated speckled intensity pattern 335 at the detector array 330. Speckles are formed since the object surface usually has roughness on the order of the laser wavelength. The detector array 330 measures the spatial and temporal behavior of the modulated speckled intensity pattern 335 at the wavelengths emitted by the laser transmitter 315.

At least one of the transmit apertures 318 includes optical elements configured to adjust the phase and direction of the beamlet 310 emitted from that aperture.

Several optical modifications may be incorporated into the system 300 without changing the basic principles of operation. For example, the individual detector 332 apertures may be merged into a single aperture. As another example, additional beamlets can be added. As another example, both the transmit apertures 318 and the detectors 332 may be arranged on a non-planar or curved surface, instead of on a planar surface as shown. The detectors may also cover areas which are round, square, elliptical or almost any convenient geometrical configuration. They may even be dispersed over multiple disjoint regions. This adaptability allows for convenient flexibility in mounting the laser transmitter 315 and the detector array 330. In addition, much of the performance is maintained even if some of the transmit apertures 318 or detectors 332 malfunction. Such robust operation can be very desirable depending upon the application.

The processor 350, which may be any type of general purpose programmable processor, receives and processes the detector array outputs 360 to form three dimensional images of the object 105. The processor 350 may also be configured to adjust the phase modulation values of one or more of the beamlets 310 emitted by the transmitter array 315 and the wavelength of the laser source 317. These operations are discussed in greater detail below.

Figure 4:
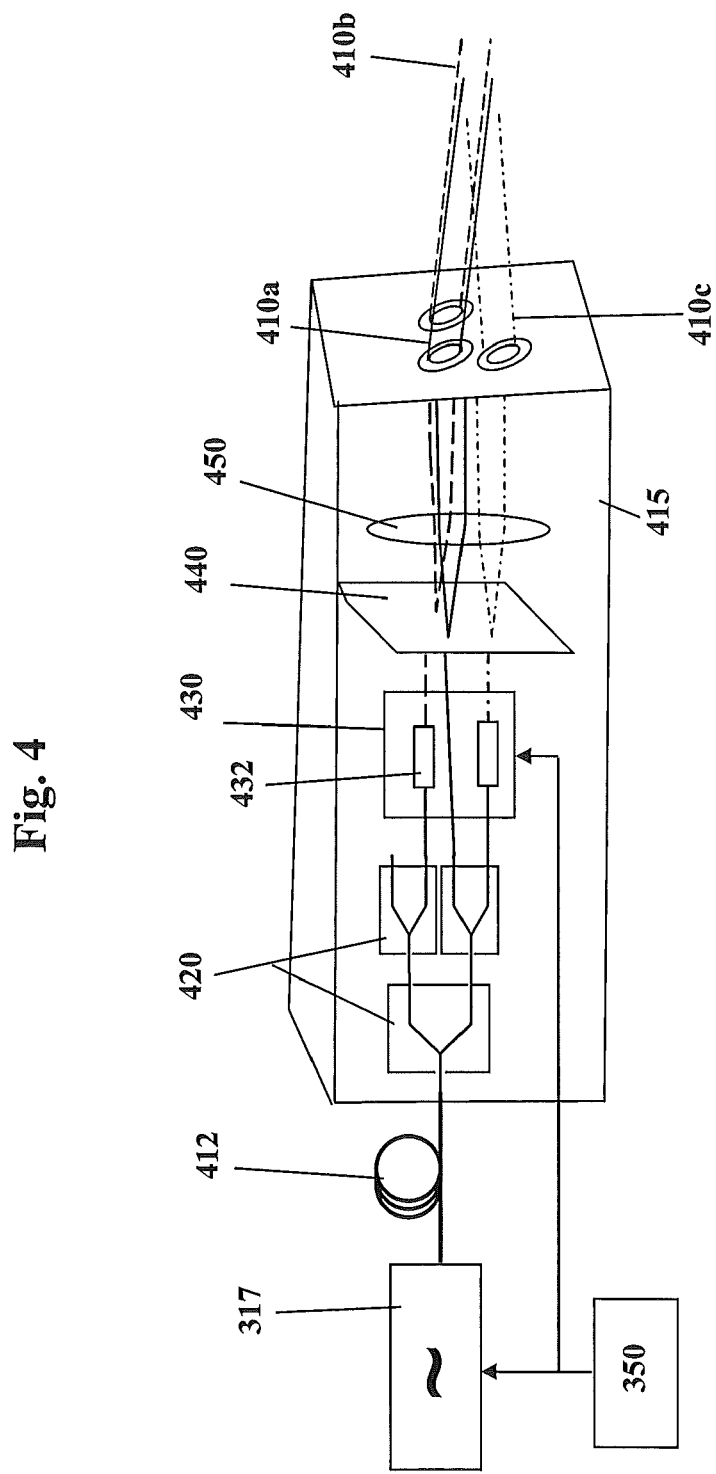
FIG. 4 illustrates a three aperture laser transmitter suitable for a three-beamlet embodiment of the three dimensional active imaging system.

FIG. 4 pertains to a three beamlet embodiment of the active imaging system and illustrates the three-beamlet three-aperture laser transmitter 415 coupled to the laser source 317 in greater detail. The laser source 317 is configured to produce laser light at least at two wavelengths. A fiber 412 connects the laser source 317 to splitters 420 that lead to three fibers each carrying a beamlet. Two of the fibers pass through phase modulators 432 and 434 included in a frequency shifter block 430. The phase modulators 432 and 434 are exercised such that the phase values ($\beta$) of the beamlets inside the fibers evolve linearly in time. The constant d $\beta$/dt leads to a change in the frequency. The fibers are mounted on the fiber mount 440 which provides alignment, azimuth and elevation control for the three emerging beamlets 410a, 410b, and 410c. A collimator 450 collimates all three beamlets 410a, 410b, and 410c. The first reference beamlet 410a has frequency ($v_0$), the second x-sheared beamlet 410b has frequency ($v_0+v_x$) and the third y-sheared beamlet 410c has frequency ($v_0+v_y$). Many alternate arrangements for construction of the laser transmitter 415 are possible.

The laser source 317 can be a tunable laser source where the processor 350 adjusts the output wavelength. Alternately, a single wavelength laser coupled to an acousto-optic modulator (AOM), also called a Bragg cell can be used. An AOM uses the acousto-optic effect to diffract and shift the frequency of incoming light using sound waves (usually at radio-frequency). If an AOM is used, the processor 350 may control the oscillating electric signal that drives the AOM transducer to vibrate which in turn changes the wavelength. Many alternate arrangements for construction of the laser source 317 are possible.

Figure 5:
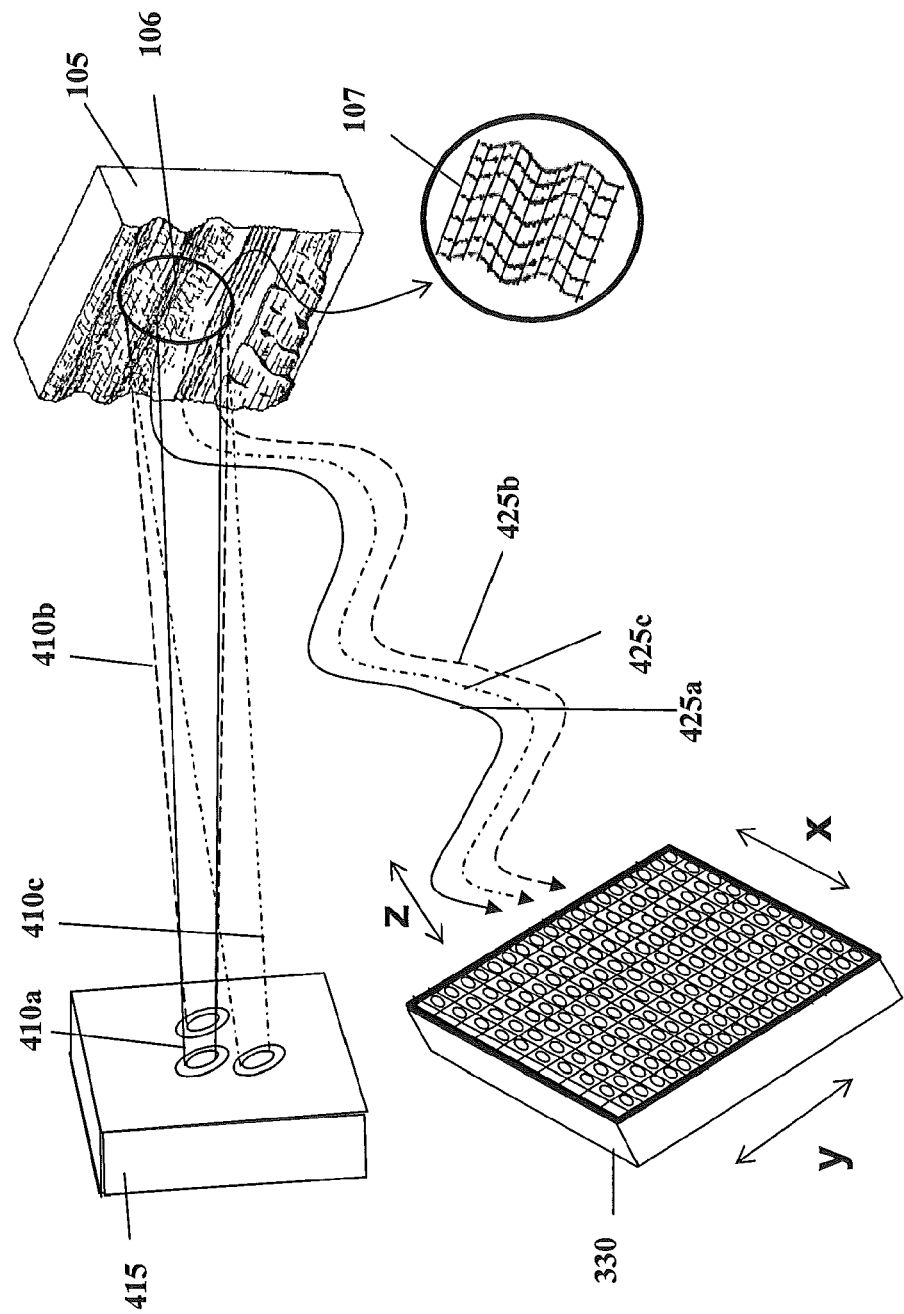
FIG. 5 illustrates a three dimensional imaging geometry for the three beamlet embodiment of the three dimensional active imaging system.

FIG. 5 illustrates the imaging geometry for the three beamlet embodiment of the three dimensional active imaging system. The three beamlets 410a, 410b, and 410c illuminate an area 106 of the object 105. The three dimensional imaging system generates a two dimensional image of the area 106 and determines the surface contours 107 of the same illuminated area 106 using the intensity values registered at the detector array which receives the light scattered from the illuminated area 106. Three outgoing beamlets 410a, 410b, and 410c result in three wavefronts 425a, 425b, and 425c. The superposition of these three wavefronts is measured by the detector array 330.

Figure 6:
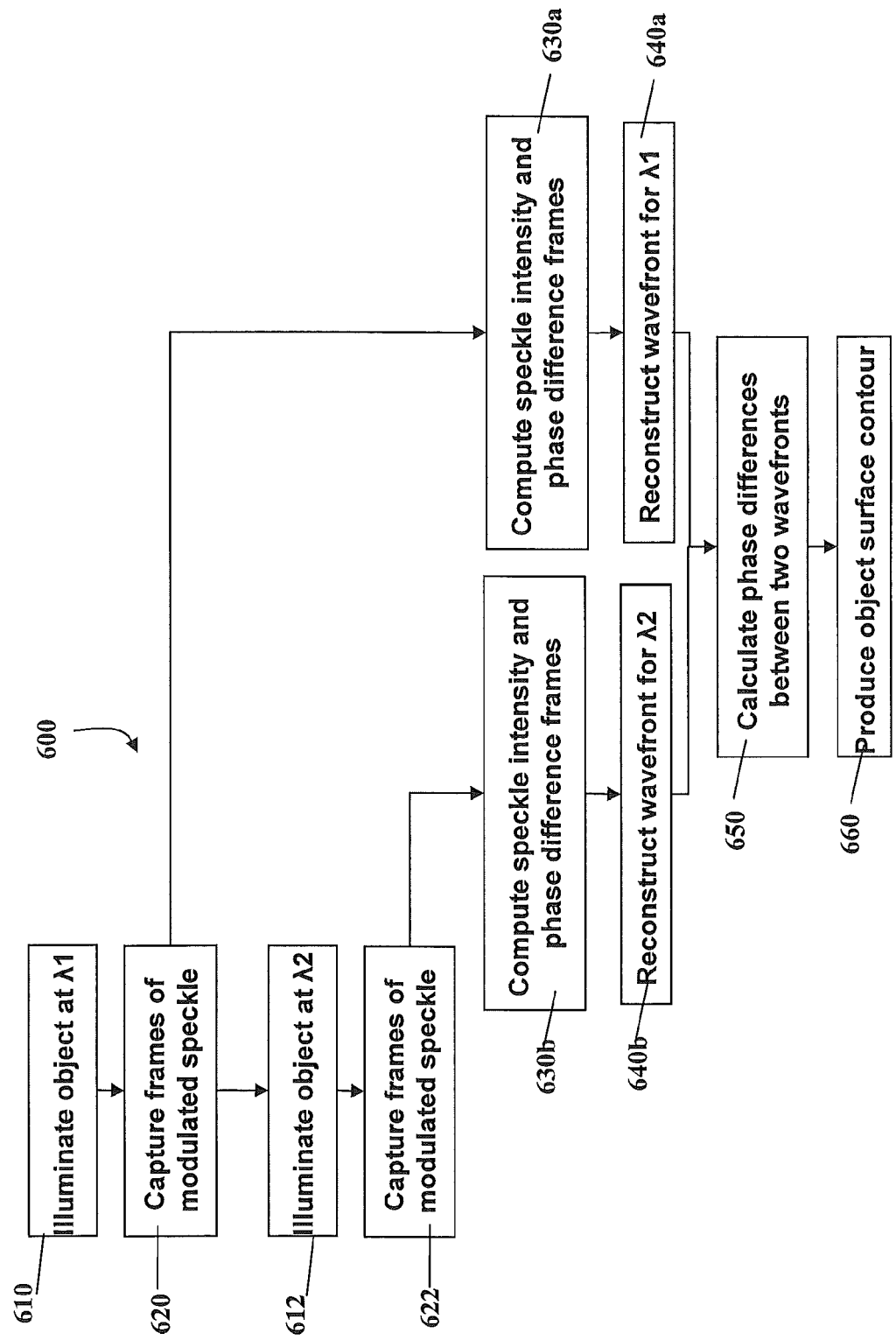
FIG. 6 is a flow chart illustrating a three dimensional imaging method suitable for the three dimensional active imaging system of FIG. 3.

FIG. 6 illustrates the procedure 600 for operating the three dimensional active imaging system 300. The process starts with step 610, namely illumination of the object 105 at the first wavelength ($\lambda$1). The processor 350 directs the laser transmitter 315 to send at least three pulsed or continuous beamlets 310 towards the object 105 at the first wavelength ($\lambda$1). During this illumination step 610 the processor 350 adjusts the phase modulators coupled to at least one of the beamlets 310 in a way that produces slight shifts in the frequency of the outgoing beamlets 310. Next, at step 620, the detector array 330 receives and captures frames of modulated speckled intensity patterns 335. In case of the three frequency-shifted beamlets example, the measured speckled intensity pattern I(r,t) is a superposition of three patterns as defined above in Equation 2. This first set of detector array measurements corresponding to the illumination at the first wavelength $\lambda$1 are communicated to the processor 350. The process continues with step 612, namely illumination of the object 105 at the second wavelength $\lambda$2. The processor 350 directs the laser transmitter 315 to send at least three pulsed or continuous beamlets 310 towards the object 105 at the second wavelength $\lambda$2. During this illumination step 612 the processor 350 adjusts the phase modulators coupled to at least one of the beamlets 310 in a way that produces slight shifts in the frequency of the outgoing beamlets 310. It should be noted that ideally all the illuminator beamlets at all wavelengths should be directed to illuminate substantially the same area on the target region with substantially the same intensity profile and phase distribution.

Next, at step 622, the detector array 330 receives and captures frames of modulated speckled intensity patterns 335. In case of the three frequency-shifted beamlets example, the measured speckled intensity pattern I(r,t) is a superposition of three patterns as defined above in Equation 2. This second set of detector array measurements corresponding to the illumination at the second wavelength $\lambda$2 are communicated to the processor 350.

Alternately, the process 600 can be modified so that steps 610 and 612 are executed in succession. In that case, step 612 will be followed by steps 620 and 622. This modification may be preferred if the object 105 is positioned a substantial distance away from the laser transmitter 315 and/or the detector array 330. For example, consider a scenario where the detector array 330 and laser transmitter 315 are positioned in close proximity and the object 105 is positioned 15 km away from the detector array 330 and the laser transmitter 315. The time interval between the laser transmitter 315 sending of the beamlets 310 and the detector array 330 registering the return light from object may be about 100 micro seconds. The laser transmitter can be configured to send out two 10 microsecond long pulses spaced 20 microseconds apart, the first pulse at the first wavelength and the second pulse at the second wavelength. Wait 100 microseconds from the initiation of the first pulse, detect the return from the first pulse for 10 microseconds, wait another 20 microseconds and then detect the return from the second pulse for another 10 microseconds. As with the case where the order of steps is 610, 620, 612, followed by 622, two sets of detector array measurements are obtained and sent to the processor 360.

At this point, the processor 350 has two sets of detector array measurements 360, where each set corresponds to data obtained at one illumination wavelength. As shown in FIG. 6, each set is processed separately. The first set corresponding to the first illumination wavelength goes through steps 630a and 640a whereas the second set corresponding to the second illumination wavelength goes through steps 630b and 640b.

At steps 630a and 630b, speckle intensity and phase difference frames are calculated. In case of the three beamlet example, the measurements 360 which have been defined as I(r,t) can be demodulated at the beat frequencies $v_x$, $v_y$, and $v_x-v_y$ to yield estimates of the intensity visibilities and phase differences also defined in Equation 3. The optical field amplitude of one of the beamlets can then be obtained from the visibility estimates. The optical phase of the wavefront can be found using the phase difference estimates. Accordingly, at steps 630a and 630b, the processor 350 demodulates the two sets of detector array measurements to yield estimates of intensity visibilities and phase differences.

Once visibility and phase difference values are computed, the next step is reconstructing the wavefronts, that is, recovering the optical field amplitude and phase. Accordingly, at steps 640a and 640b, two wavefronts are constructed, one corresponding to the first illumination wavelength and the other corresponding to the second illumination wavelength. In case of the three beamlet example, these two wavefronts are both estimates of $A_0(r,t)$ in Equation 1. The first wavefront can be labeled $A_0\lambda1(r,t)$ and the second wavefront can be labeled $A_0\lambda2(r,t)$.

The next step 650 calculates the phase differences between the two wavefronts $A_0\lambda1(r,t)$ and $A_0\lambda2(r,t)$. The phase difference at detector position r is proportional to the relative object surface contour depth at that detector position. The final step 660 produces an object surface contour image using the phase differences. One option for constructing this contour image involves continuizing the phase differences.

Selection of the numerical values of the illumination wavelengths requires some consideration. The object surface contour depth change along the z direction (Δz) corresponding to a 2π change in speckle phase is equal to $\lambda 1 \lambda 2/(2\Delta\lambda)$ where $\lambda 1$ is the first illumination wavelength, $\lambda 2$ is the second illumination wavelength and $\Delta\lambda$ is the difference between the two illumination wavelengths. As an example, consider two illumination wavelengths, $\lambda 1=1.5000000562$ microns and $\lambda 2=1.5000000000$ microns. Using these two illumination wavelengths will result in a surface contour depth range of 20 m. Depth variations greater than 20 m may be ambiguous. On the other hand, within the 20 m depth range, one can expect a resolution of 10 cm or better.

By illuminating with a third wavelength at a larger $\Delta\lambda$, the accuracy of range resolution can be increased by an order of magnitude similar to the process used in multi-wavelength interferometry. As an example, consider three illumination wavelengths, $\lambda 1=1.5000000562$ microns, $\lambda 2=1.5000000000$ microns, and $\lambda 3=1.5000006170$ microns. Illumination at the first two wavelengths ($\lambda 1$, $\lambda 2$) leads to a depth contour phase change of 2π every 20 m as explained earlier. Adding illumination at $\lambda 3$ leads to a depth contour phase change of 2π every 2 m which can further refine the accuracy of the depth contour obtained using just ($\lambda 1$, $\lambda 2$) illumination wavelengths. This approach can be applied further using a fourth, fifth, and sixth illumination wavelengths to further refine the depth contour image of the object.

Since most targets scatter independent speckle patterns into each polarization, this range sensing process can be applied to both polarizations simultaneously to get two independent range images. Since the speckle intensities will be independent, the number of places where both speckle patterns become dark will be greatly reduced, providing a better quality range image.

Figure 7:
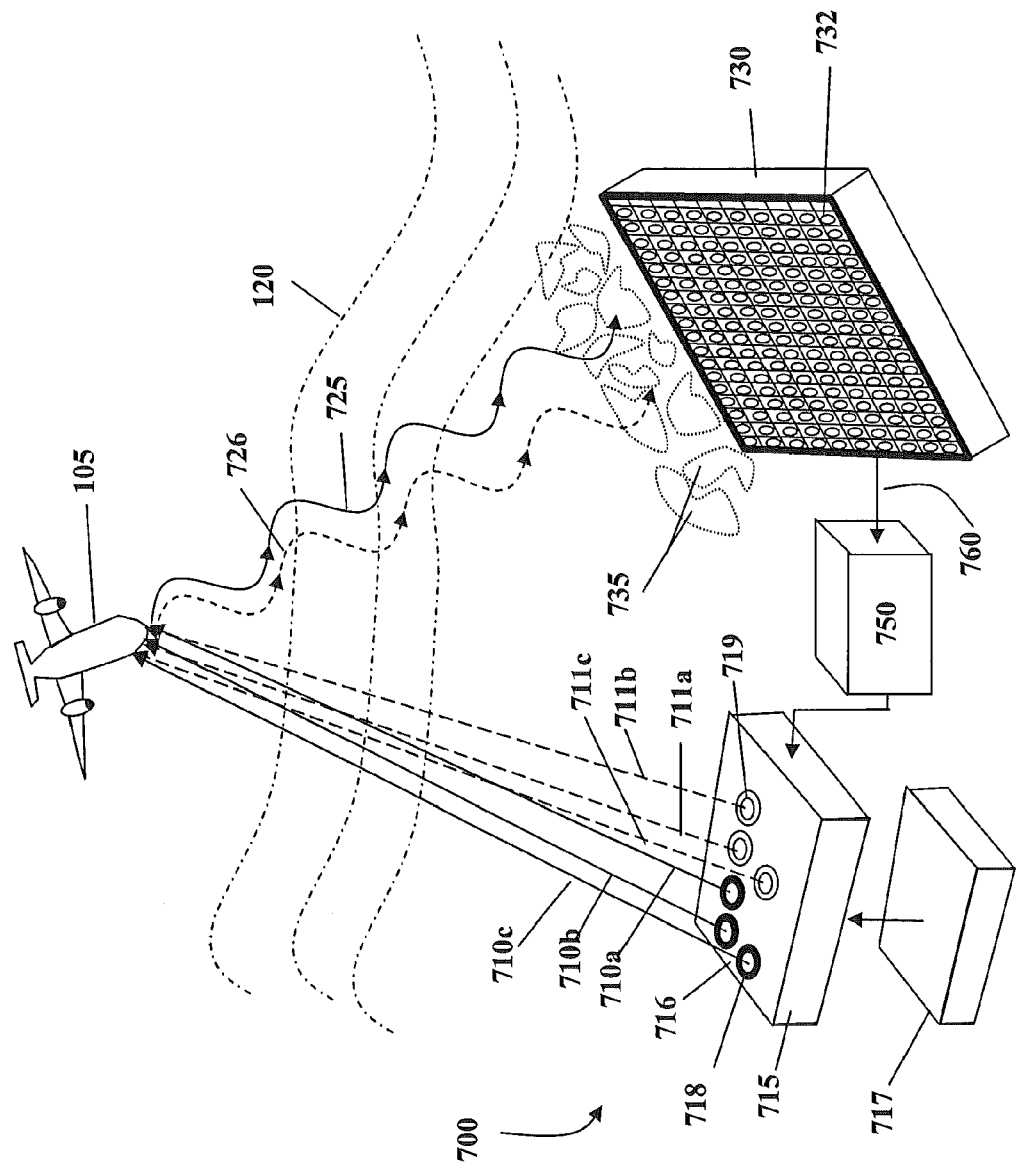
FIG. 7 schematically illustrates a two dimensional turbulence immune embodiment of the active imaging system.

FIG. 7 illustrates a two dimensional turbulence immune active imaging system 700. A laser transmitter 715 is configured to emit at least two sets 710,711 of at least three beamlets through at least two sets of spatially distinct transmit apertures 718, 719 and a detector array 730 is configured to receive light 725,726 scattered by a object 105 illuminated by the beamlets 710,711. The laser transmitter 715 may be a stand alone device capable of producing laser light or receiving laser light from a laser source 717. The detector array 730 is an array of individual intensity detectors 732. A processor 750 communicates with the detector array 730 and is configured to form images of the object 105 based upon the output from the detector array 760. The processor 350 may also be configured to control the laser transmitter 715. Two of the three beamlets in each set are laterally displaced (sheared) with respect to the reference beamlet of that set. Three beamlets (710a, 710b, and 710c) emanate from transmit apertures at the laser transmitter plane 716. The reference beamlet 710a, the beamlet 710b which is sheared in the x direction with respect to the referenced beamlet 710a, and the beamlet 710c which is sheared in the y direction with respect to the reference beamlet 710a, form an "L" spatial pattern. Similarly, the reference beamlet 711a, the beamlet 711b which is sheared in the x direction with respect to the referenced beamlet 711a, and the beamlet 711c which is sheared in the y direction with respect to the reference beamlet 711a, form an "L" spatial pattern. The beamlets 710a, 710b, and 710c are also shifted slightly in frequency with respect to one another. The first reference beamlet 710a has frequency ($v_0$), the second x-sheared beamlet 710b has frequency ($v_0+v_x$), and the third y-sheared beamlet 710c has frequency ($v_0+v_y$). Similarly, the beamlets 711a, 711b, and 711c are also shifted slightly in frequency with respect to one another. The first reference beamlet 711a has frequency ($v_0$), the second x-sheared beamlet 711b has frequency ($v_0+v_x$), and the third y-sheared beamlet 711c has frequency ($v_0+v_y$). The frequency differences cause the beamlets to "beat" at the object at the difference frequencies. The beat frequencies are $v_x$, $v_y$, and $v_x-v_y$. The frequency shifts are usually very small compared to the actual frequencies of the beamlets. The frequency shifts may be realized using phase modulators included in the laser transmitter 715. The processor 750 may be configured to control the phase modulators associated with at least one of the beamlets. The beamlets 710,711 travel through a turbulent medium 120 and reach the object 105. The object 105 scatters the incident beamlets 710,711. The scattered laser light 725, 726 produces a modulated speckled intensity pattern 735 at the detector array 730. Speckles are formed since the object surface usually has roughness on the order of the laser wavelength. The detector array 730 measures the spatial and temporal behavior of the modulated speckled intensity pattern 735.

At least one of the transmit apertures 718,719 includes optical elements configured to adjust the phase and direction of the beamlet 710,711 emitted from that aperture. Details of the transmit apertures 718,719 and the operation of the processor 750 are discussed in greater detail below.

Several optical modifications may be incorporated into the system 700 without changing the basic principles of operation. For example, the spatially distinct aperture sets 718 and 719 may be realized by reconfiguring the aperture sets so that one aperture set (e.g., 718) can be repositioned on the laser transmitter plane 716 to assume the position of another aperture set (e.g., 719). As another modification example to the imaging system 700, the individual detector 732 apertures may be merged into a single aperture. As yet another example, additional beamlets can be added. As a further example, both the transmit apertures 718,719 and the detectors 732 may be arranged on a non-planar or curved surface, instead of on a planar surface as shown. The detectors may also cover areas which are round, square, elliptical or almost any convenient geometrical configuration. They may even be dispersed over multiple disjoint regions. This adaptability allows for convenient flexibility in mounting the laser transmitter 715 and the detector array 730. In addition, much of the performance is maintained even if some of the transmit apertures 718,719 or detectors malfunction. Such robust operation can be very desirable depending upon the application.

Figure 8:
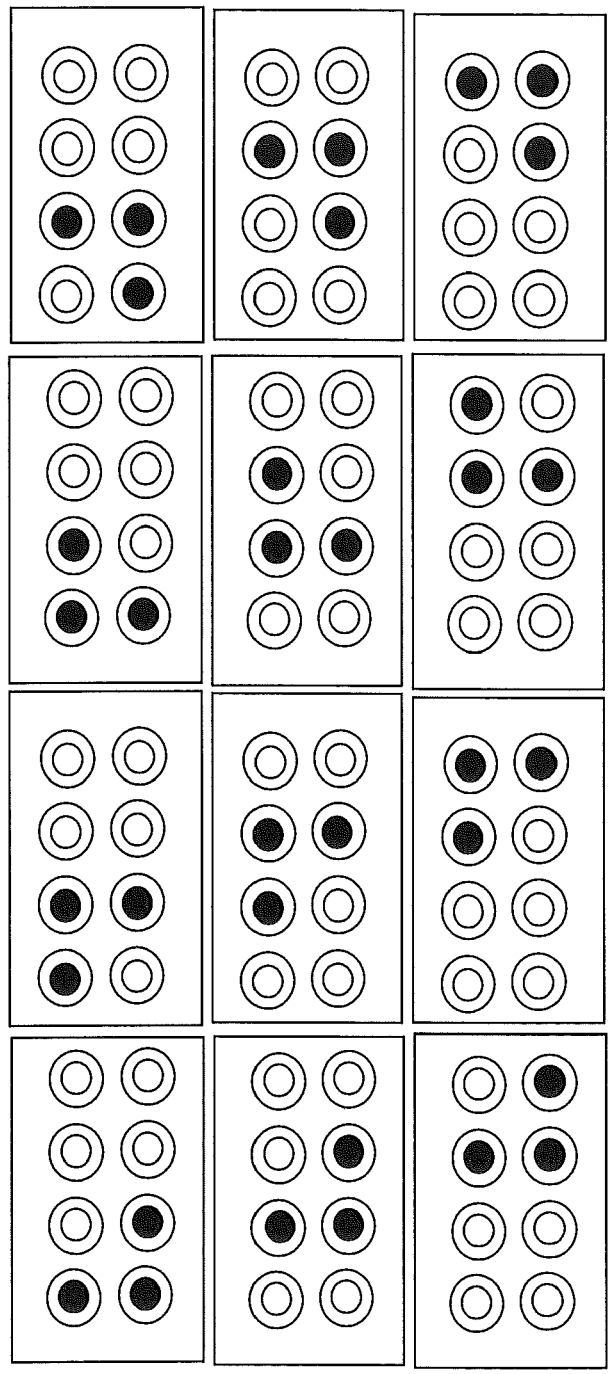
FIG. 8 illustrates a manner of illumination suitable for the imaging system of FIG. 7.

FIG. 8 illustrates how a 2×8 aperture array can be exercised to produce 12 spatially distinct sets of apertures. In each set, only three beamlets (darkened apertures) are emitted from the laser transmitter. Such a 2×8 aperture array can be configured as part of the laser transmitter 715.

The processor 750, which may be any type of general purpose programmable processor, receives and processes the detector array outputs 760 to form turbulence mitigated two dimensional images of the object 105. The processor 750 may also be configured to adjust the phase modulation values of one or more of the beamlets 710,711 emitted by the transmitter array 715. These operations are discussed in greater detail below.

FIG. 9 illustrates the procedure 900 for operating the turbulence immune two dimensional active imaging system 700. The process starts with step 910, namely illumination of the object 105 with three beamlets emanating from apertures 718. The processor 750 directs the laser transmitter 715 to send three of pulsed or continuous beamlets 710a, 710b, and 710c towards the object 105. During this illumination step 910 the processor 350 adjusts the phase modulators coupled to at least one of the beamlets 710a, 710b, and 710c in a way that produces slight shifts in the frequency of the outgoing beamlets. Next at step 920, the detector array 730 receives and captures frames of modulated speckled intensity patterns 735. The measured speckled intensity pattern I(r,t) is a superposition of three patterns as defined above in Equation 2. This first set of detector array measurements corresponding to the illumination through the first set of apertures (a1) are communicated to the processor 750. The process continues with step 912, namely illumination of the object 105 with three beamlets emanating from apertures 719. The processor 750 directs the laser transmitter 715 to send three pulsed or continuous beamlets 711a, 711b, and 711c towards the object 105 through the second set of apertures (a2). During this illumination step 912, the processor 350 adjusts the phase modulators coupled to at least one of the beamlets 311a, 311b, and 311c in a way that produces slight shifts in the frequency of the outgoing beamlets. Next, at step 922, the detector array 730 receives and captures frames of modulated speckled intensity patterns 735. The measured speckled intensity pattern I(r,t) is a superposition of three patterns as defined above in Equation 2. This second set of detector array measurements corresponding to the illumination through the second set of apertures (a2) are communicated to the processor 750.

Alternatively, the process 900 can be modified so that steps 910 and 912 are executed in succession. In that case, step 912 will be followed by steps 920 and 922. This modification may be preferred if the object 105 is positioned a substantial distance away from the laser transmitter 715 and/or the detector array 730. For example, consider a scenario where the detector array 730 and laser transmitter 715 are positioned in close proximity and the object 705 is positioned 15 km away from the detector array 730 and the laser transmitter 715. The time interval between the laser transmitter 715 sending of the beamlets 710a, 710b, and 710c and the detector array 330 registering the return light from object may be about 100 micro seconds. The laser transmitter can be configured to send out two 10 microsecond pulses spaced 20 microseconds apart, the first pulse at the first wavelength and the second pulse at the second wavelength. Wait 100 microseconds from the initiation of the first pulse, detect the return from the first pulse for 10 microseconds, wait another 20 microseconds and then detect the return from the second pulse for another 10 microseconds. As with the case where the order of steps is 910, 920, 912, followed by 922, two sets of detector array measurements are obtained and sent to the processor 750.

As a side note, in general, the time spacing of the two illumination pulses should be as close as possible to keep all disturbances as much the same as possible. This may result in a higher quality range image.

At this point, the processor 750 has two sets of detector array measurements 760, where each set corresponds to illumination through a spatially distinct set of apertures. As shown in FIG. 9, each set is processed separately. The first set corresponding to the first aperture set goes through steps 930a whereas the second set corresponding to the second aperture set goes through step 930b.

At steps 930a and 930b, speckle intensity and phase difference frames are calculated. The measurements 760 which have been defined as I(r,t) can be demodulated at the beat frequencies $v_x$, $v_y$, and $v_x-v_y$ to yield estimates of the intensity visibilities and phase differences also defined in Equation 3. Accordingly, at steps 930a and 930b, the processor 750 demodulates the two sets of detector array measurements to yield estimates of intensity visibilities and phase differences.

Once visibility and phase difference values are computed, the next step 940 is refining these intensity and phase difference estimates in a manner that renders them less susceptible to the adverse effects of atmospheric turbulence. One simple technique is just to translate the second speckle pattern to register it with the first and then sum. This will provide intensity weighted combination of complex speckle gradients used in the complex exponential reconstructor.

Once visibility and phase difference values are refined, the next step 950 is reconstructing the wavefront, that is, recovering the optical field amplitude and phase. The reconstructed wavefront is an estimate of $A_0$(r,t) as defined in Equation 1. At the following step 960, the wavefront is inverse Fourier transformed and the squared modulus is computed to yield a two dimensional snapshot image 952. This two dimensional snapshot image 952 is often speckled.

It will be obvious to those skilled in the art that the three dimensional active imaging system 300 and the two dimensional turbulence immune imaging system 700 can be combined into a single active imaging system which is both turbulence immune and capable of producing three dimensional images. Correspondingly, the method 600 for operating the three dimensional active imaging system 300 can be combined with the method 900 for operating the two dimensional turbulence immune imaging system 700.

Furthermore, several optical modifications may be incorporated into the system 300 or the system 700 or any hybrids thereof to extend the application domains and to accommodate operational constraints without changing the basic principles of operation:

A first optical modification involves the detector array. A focal plane array (FPA) with multiple detectors can be used as a detector array. The size of the FPA is an important consideration. Due to manufacturing limitations and high cost of large FPAs, it may be more practical or more cost effective to tile multiple small FPAs rather than manufacture one large FPA. However, multiple FPAs may produce separate areas of reconstructed complex aperture data which must be phased up to obtain one single high resolution image. A statistical technique to phase accurately across the gaps between FPA areas may be used to overcome this limitation. One such technique which accurately phases speckle patterns across gaps between tiled FPAs involves using the vanCittert-Zernike Theorem (Eq. 4) which simply says that the mean of the conjugate product between nearby speckle amplitudes (called the speckle correlation function) is proportional to the Fourier transform of the incoherent image.

$$Cor_{spkl}(\vec{y} - \vec{x}) = $$

$$\mathrm{Mean}\overline{(A_{tgt}(\vec{x}) \cdot A_{tgt}(\vec{y}))} = Const \cdot \int I_{tgt}(\vec{\alpha}) \cdot e^{i k \cdot \vec{\alpha} \cdot \vec{x}} d\vec{\alpha}$$

Equation 4

The speckle patterns that originate from each FPA in the tile of FPAs has its own reconstructed speckle pattern, and all of them have the same speckle statistics since they come from the same illuminated object. Thus, there are many data points available to compute an accurate estimate of the speckle correlation function over separations that cover the gap between FPA tiles. Once the speckle correlation function is known, then phasing the speckle tiles can be accomplished as described below.

Suppose that two (256×256 pixel) FPA tiles are separated by two pixels. Then, one can take two points separated by 3 pixels, one on one tile and one on the other. Suppose their phase difference is 1.24 radians while the speckle correlation function shows a phase at the same separation of 0.16 radians. This means that one can estimate the phase error between the two tiles as Δφ=1.24−0.16=1.08 radians. This first estimate is unlikely to be accurate because the actual phase difference between two points in a speckle pattern is a random variable whose mean is given by the van Cittert-Zernike theorem. To compute an accurate estimate of the true phase difference between two speckle tiles, one must use many pixels and average the result as shown in Eq. 5 where $x_1$ represents points in tile 1 and $x_2$ points in tile 2. Within four pixels of the edge of a 256×256 tile, we have several thousand point pairs within 8 pixels of each other which can be summed together to get a very accurate estimate of the phase difference.

$$\Delta\phi_{est} = \arg\left[\sum_{\vec{x}_1}\sum_{\vec{x}_2} \overrightarrow{(A_1(\vec{x}_1)A_2(\vec{x}_2))} \cdot \overrightarrow{Cor_{spkl}(\vec{x}_2 - \vec{x}_1)}\right]$$ Equation 5

In general, this phasing technique is suitable for three pixel gaps due to the large number of pixels averaged and the low spatial frequencies of the image used in the tile phasing which generally have significant amplitude. The phase differences between adjacent tiles are again reconstructed into absolute phases using the complex exponential reconstructor. The speckle tiles are each multiplied by the resulting complex phase correction which allows the resolution of the full aperture to be obtained.

A second optical modification involves the laser transmitter, in particular shaping of the outgoing beamlets. The beamlets often have a Gaussian profile. The beamlet profiles can be modified using various techniques known to those skilled in the art. One example of beam shaping is the apodization of the transmit apertures. The main motivation for this modification is minimizing the number of detectors needed for making a high quality image. Apodization of transmit apertures in phase or amplitude, or in both phase and amplitude results in a compact, uniform illumination pattern which in turn maximizes the speckle size. Increased speckle size, in turn, reduces the number of detectors or FPA pixels needed to image an object.

A third optical modification involves the laser transmitter. Specifically, the transmit apertures or the optical components coupled to the transmit apertures are reconfigured to emit beamlets with structured illumination patterns. This modification offers advantages when imaging objects with little or no distinguishable gray scale features but distinguishable surface contours, e.g., a stone carving or statue. When the imaged object has distinguishable surface contours but almost no gray scale features, the speckle correlation functions can look like a delta function with little phasing information available. To image these types of objects and make their surface contours more distinguishable, a structured illumination pattern can be employed. One example structured illumination pattern has a sinusoidal intensity superimposed on a constant level. One way to form this type of illumination pattern on the object is to transmit from two spatially distinct sets of triple apertures simultaneously. The superposition of beamlets will create the effect of a two source interference pattern on the target. By adjusting the separation of the apertures, the spatial period of the sinusoidal pattern can be set as desired. This type of illumination also imposes a spatial frequency on the object which creates strong correlations between pixels across the gap between FPA tiles. Consequently, this third optical modification can be combined with the first optical modification to tile FPAs for all object types and even allow substantial gaps between FPAs for cost reduction.

As a final note, we turn to processing of multiple speckled images to improve the quality of the two dimensional images of the object. As already discussed earlier, since the two dimensional images obtained using the disclosed active imaging system and method are highly speckled, multiple two dimensional speckle images are required to produce high quality gray scale images of the object. These multiple images must be gathered rapidly and then registered to correct potential translation, rotation and magnification shifts. By correlating accurately in subimages and extracting polynomial modes of x and y translation, one can deduce and correct changes. The said changes occur not just in translation but also in magnification and object rotation due to range and orientation shifts that occur during the cumulative exposure period while dozens of coherent images are gathered.

Many different types of image registration algorithms are possible for speckled imagery. As two examples, one can consider using the complex wavefront or using the real intensity image. In general the filtered correlation function between intensity images is the better estimator of frame registration. Having more speckles per frame and a range image (which has little speckle noise compared to the intensity image and frequently more detail) provides additional information for the image registration process.

Thus, an active imaging system and method are disclosed. While embodiments of these inventions have been shown and described, it will be apparent to those skilled in the art that many more modifications are possible without departing from the inventive concepts herein. The inventions, therefore, are not to be restricted except in the spirit of the following claims.

What is claimed is:
1. A method for imaging an object, the method comprising;
emitting three beamlets through a first set of apertures from a laser transmitter to illuminate the object;
detecting the laser light scattered from the object;
emitting three beamlets through a second set of apertures from a laser transmitter to illuminate the object;
detecting the laser light scattered from the object;
computing a speckle intensity and phase difference frames of light detected for each set apertures;
combining the speckle intensity and phase difference frames of light detected for each set apertures to generate a single set of refined intensity and phase difference estimates;
reconstructing the wavefrom from the refined intensity and phase difference estimates; and
forming a speckled intensity image of the object.

* * * * *